US008943215B2

(12) United States Patent
Patten et al.

(10) Patent No.: US 8,943,215 B2
(45) Date of Patent: Jan. 27, 2015

(54) DISTRIBUTED SMOOTH STREAMING UTILIZING DYNAMIC MANIFESTS

(75) Inventors: Michael Patten, Sammamish, WA (US); Gregory David Swedberg, Bellevue, WA (US); Ondrej Lehecka, Kirkland, WA (US); Waiman Lam, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 272 days.

(21) Appl. No.: 12/974,710

(22) Filed: Dec. 21, 2010

(65) Prior Publication Data

US 2012/0158985 A1 Jun. 21, 2012

(51) Int. Cl.
G06F 9/44 (2006.01)
H04N 21/63 (2011.01)
G06F 15/16 (2006.01)
H04L 29/06 (2006.01)
H04L 29/08 (2006.01)

(52) U.S. Cl.
CPC ............ *H04L 65/608* (2013.01); *H04L 67/108* (2013.01)
USPC ............................ 709/231; 717/169; 725/105

(58) Field of Classification Search
USPC .................. 709/231, 201–211; 725/86–98
See application file for complete search history.

(56) References Cited

U.S. PATENT DOCUMENTS 7,480,441 B2   1/2009  Klausberger et al.
8,169,916 B1 *  5/2012  Pai et al. .................. 370/238
8,402,556 B2   3/2013  Bradley 2005/0203851 A1 *  9/2005  King et al. ............ 705/51
2006/0156354 A1   7/2006  Jung et al.
2008/0133767 A1   6/2008  Birrer et al.

(Continued)

FOREIGN PATENT DOCUMENTS

CN        101388909 A      3/2009

OTHER PUBLICATIONS

Zambelli, Alex, "IIS Smooth Streaming Technical Overview", Retrieved at << http://dvb-crew.atw.hu/applications/documents/IIS_Smooth_Streaming_Technical_Overview.pdf >>, Mar. 2009, pp. 1-17.
Shah, et al., "Peer-to-Peer Multimedia Streaming Using BitTorrent", Retrieved at << http://citeseerx.ist.psu.edu/viewdoc/download-?doi=10.1.1.63.9910&rep=rep1&type=pdf >>, 2007, pp. 8.

(Continued)

*Primary Examiner* — Michael Thier
*Assistant Examiner* — Yaotang Wang
(74) *Attorney, Agent, or Firm* — Bryan Webster; Kate Drakos; Micky Minhas

(57) ABSTRACT

Content can be segmented and each segment encoded at multiple different quality levels. A manifest file can describe the segments, and encodings thereof, present on each computing device. A channel definition can define content, users and computing devices among which such content is shared. Computing devices receive notification of any new shared and can stream or download it from any one or more other computing devices that have such content encoded at a quality appropriate for the capabilities of the recipient computing device. The recipient computing device can aggregate manifests from currently available computing devices, or can receive an already aggregated manifest. The multi-segmented multi-encoded content can be obtained from multiple computing devices simultaneously by obtaining interleaving segments from individual computing devices. If content still cannot be obtained efficiently, a different encoding can be selected, thereby potentially making available other computing devices as additional sources.

17 Claims, 11 Drawing Sheets

(56) References Cited

U.S. PATENT DOCUMENTS

| | | | |
|---|---|---|---|
| 2009/0030976 A1* | 1/2009 | Shukla et al. | 709/203 |
| 2009/0077254 A1 | 3/2009 | Darcie et al. | |
| 2010/0049867 A1* | 2/2010 | Panwar et al. | 709/231 |
| 2010/0169414 A1* | 7/2010 | Pavot et al. | 709/203 |
| 2011/0072075 A1* | 3/2011 | Gautier | 709/203 |

OTHER PUBLICATIONS

"Wowza Media Server 2: Quick Start Guide for Version 2.1.2", Retrieved at << http://www.wowzamedia.com/quickstart_2_1_2.html >>, Retrieved Date: Sep. 24, 2010, pp. 17.

"Search Report", Mailed Date: Dec. 22, 2013, State Intellectual Property Office of People's Republic China Application No. 201110432325.3, Filed Date: Dec. 21, 2011, pp. 2.

* cited by examiner

DISTRIBUTED SMOOTH STREAMING UTILIZING DYNAMIC MANIFESTS

BACKGROUND

The ubiquity of network communications between and among computing devices has resulted in ever increasing amounts of information being exchanged through such communications. For example, as the throughput of network communications has increased, it has become more practical to exchange audio or video entertainment, such as songs, movies, and the like through network communications between computing devices. Traditionally, audio or video entertainment is either obtained from centralized services, such as those that enable users to stream or download professionally produced audio or video entertainment, or it is individually exchanged among multiple users within a small group of such users, such as, for example, within an extended family. Audio or video entertainment that is exchanged among the users of a small group of users typically comprises content that was either generated by, or has special relevance or significance to, that small group of users. For example, home movies can be exchanged among the individuals of an extended family.

Often, the delivery of audio or video entertainment through network communications is performed such that a user of the computing device to which such content is being delivered can hear or view the content in real-time as it is being delivered to the computing device. As will be recognized by those skilled in the art, such delivery is traditionally referred to as "streaming", and specific formats have been developed within which the audio or video entertainment can be encoded or stored to facilitate the streaming of such content. One such format divides the audio or video entertainment into segments and then encodes each such segment multiple times. For example, one encoding of a segment can preserve high fidelity, while another encoding of the same segment can lose fidelity, but result in a smaller size. Since each segment can define a particular, specific portion of the audio or video entertainment, any one encoding of a particular segment can be interchangeable with any other encoding of that same segment. Thus, when such content is to be streamed, the streaming can switch between different encodings in accordance with the ability of the source computing device to send information quickly enough, and in accordance with the ability of the destination computing device to receive information quickly enough. Because each segment of the audio or video entertainment was already encoded multiple times, and so saved, switching between different encodings can be done quickly and efficiently.

Centralized services that enable a multitude of users to download audio or video entertainment, such as professionally produced audio or video entertainment, including commercially released movies, typically invest substantial resources to ensure that they have access to a sufficient amount of network bandwidth to send information as quickly as their customers can receive such information. In such cases, it is often the receiving computing devices' ability to receive content that limits the speed with which such audio or video entertainment is delivered to a user or customer of such a centralized service.

By contrast, when users share audio or video entertainment amongst themselves, such content is typically being copied directly from one user's computing device to another user's computing device and, in such cases, the delivery of such audio or video entertainment can be substantially hampered by the network connectivity of the users' computing devices. For example, as will be known by those skilled in the art, users' computing devices typically send and receive network communications through a network service provider that can, and often does, limit the speed with which a user's computing device can send information. Consequently, while a user may be able to download a commercially released movie from a centralized service within a reasonable amount of time, that same user may have difficulty in efficiently downloading a home movie from a family member's computing device if a network service provider limits the speed with which such a family member's computing device can transmit information.

SUMMARY

In one embodiment, content can be streamed, or downloaded, from multiple computing devices simultaneously. A manifest file can describe the encodings of segmented content present on a particular computing device. Utilizing such manifest files, a recipient computing device can identify one or more source computing devices from which the recipient can simultaneously obtain a particular encoding of the segmented content. If multiple source computing devices are available, the recipient computing device can select to receive interleaving segments of the segmented content, thereby downloading the segmented content, in aggregate, faster than it could from any one source computing device by itself.

In another embodiment, a recipient computing device can obtain manifest files from other computing devices that are currently available, and can then aggregate such obtained manifest files to determine from which one or more other computing devices the recipient computing device could request a particular encoding of one or more segments of segmented content. Alternatively, a recipient computing device could obtain such an aggregated manifest file from a server computing device. The server computing device can continually monitor the availability of client computing devices having individual manifest files, and can, based on such availability, itself generate the aggregated manifest file, which can then be provided, as requested, to client computing devices.

In a further embodiment, content to be shared among a defined set of users and a defined set of computing devices can be identified in a channel definition, which can also define the set of users and the set of computing devices to which such content is to be shared. Such a channel definition can be maintained by a server computing device that can monitor the availability of those users and their computing devices, and can notify such users and such computing devices of the availability of a new content, or it can be maintained by individual computing devices and can be shared and updated via peer-to-peer communications.

In a still further embodiment, content to be shared can be segmented and each segment can be encoded multiple times, each time utilizing different encoding parameters. Such multi-segment multi-encoded content can be shared and each computing device can select one or more encodings of that content that are appropriate for that computing device, given that computing device's physical capabilities, processing capabilities, and network communication capabilities, among other factors.

In a yet further embodiment, if a selected encoding of the multi-segment multi-encoded content cannot be delivered to a recipient computing device with appropriate efficiency, the recipient computing device can select a different encoding that can be received more efficiently. In selecting the different encoding, the recipient computing device can begin to receive segments from computing devices from which the recipient computing device was not previously receiving segments, since such computing devices did not comprise segments encoded in the previously selected encoding scheme, but do comprise segments encoded in the currently selected encoding scheme.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
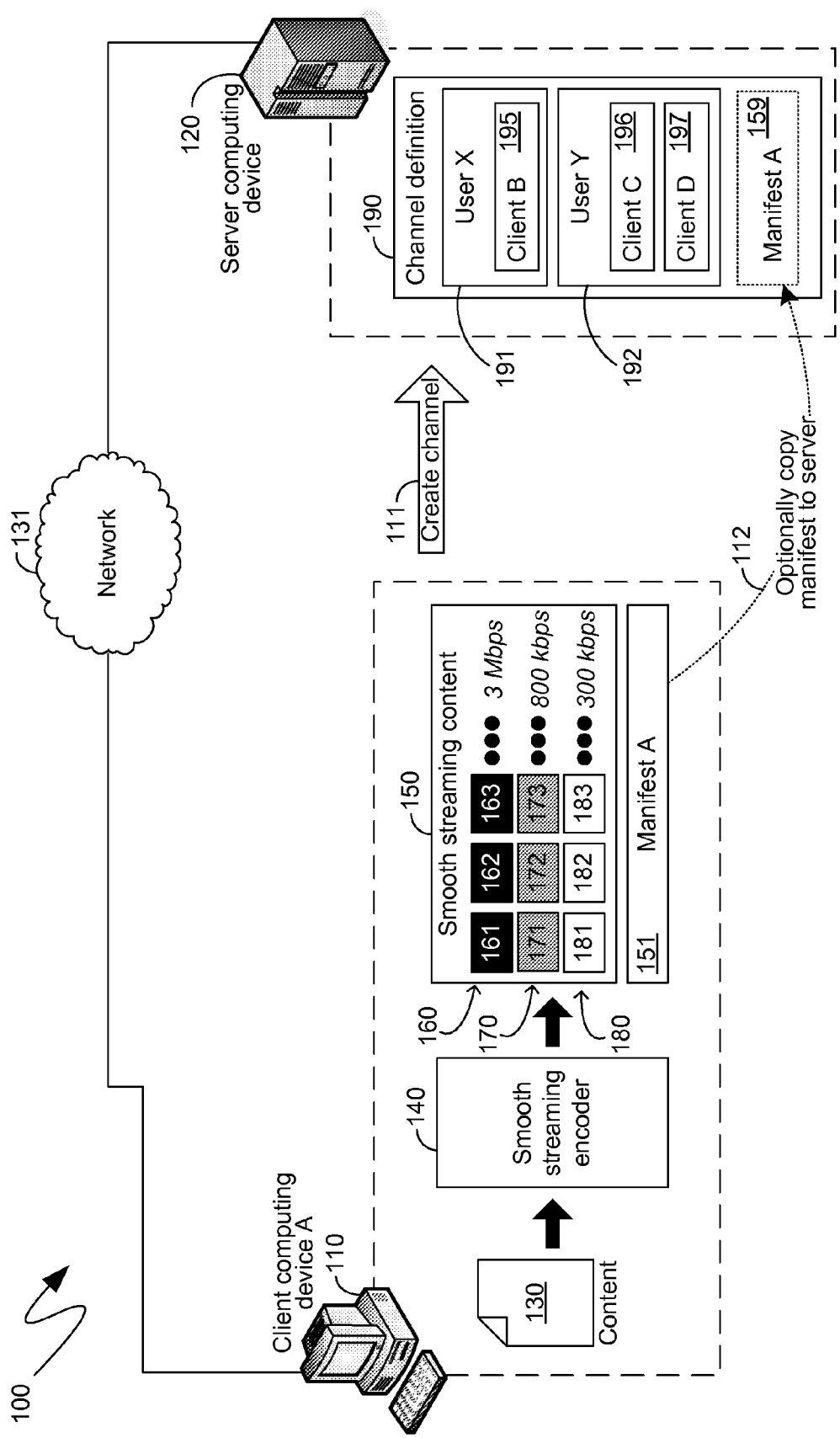
FIG. 1 is a block diagram of an exemplary encoding of a file into a smooth streaming format.

The following description relates to the streaming or download of audio or video content from one or more source computing devices, simultaneously, to a destination computing device to provide for increased transfer efficiency. The audio or video content can be segmented and each segment can be encoded utilizing different encoding parameters or techniques such that each differently encoded segment can provide a different quality level with a commensurate difference in size or resource consumption. A manifest file can describe the segments, and the encodings thereof, present on each computing device. A channel definition, such as one maintained by a server computing device, can define content and users and computing devices among which such content is to be shared. Computing devices receive notification of any new such content that is to be shared with them and can stream or download such content from any one or more other computing devices that have such content encoded in a manner appropriate for the capabilities of the computing device that is to receive it. The recipient computing device can aggregate manifests from currently available computing devices, or it can receive an already aggregated manifest, such as from the server computing device, and can select, based on the aggregated manifest, one or more other computing devices from which to obtain content. The multi-segmented multi-encoded content can be obtained from multiple computing devices simultaneously by obtaining interleaving segments from individual computing devices, thereby obtaining the content more efficiently. If the content still cannot be obtained as efficiently as desired, a different encoding can be selected. In such a case segments encoded in the newly selected encoding may be able to be obtained from computing devices that were not previously providing content.

For purposes of illustration, the techniques described herein make reference to audio and video content and encoding schemes relevant to such content. Such references, however, are strictly exemplary and are not intended to limit the mechanisms described to the specific examples provided. Indeed, the techniques described are applicable to any encoding mechanisms as applied to any type of content.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100 is shown, comprising a client computing device 110 and a server computing device 120 that are communicationally coupled to one another through a general network 131, thereby enabling communications between them. Although illustrated within the context of separate physical computing devices, the mechanisms described herein are equally applicable to independent processes executing on a single computing device, such as processes that create virtualized computing devices and computing environments. Consequently, illustrations of, and references to, physical computing devices are also intended to encompass virtual computing devices supported by processes executing on one or more physical computing devices.

Initially, some content 130, such as, for example, audio content, video content, other multimedia content, or any combination thereof, can be encoded into a smooth streaming content in which multiple segments of the content 130 are encoded utilizing multiple different encoding parameters for each segment. A smooth streaming encoder 140 can initially segment the content 130 into one or more segments that need not be equivalently sized. For example, in one embodiment, the content 130 can be audio and video content, such as a video file, and the smooth streaming encoder 140 can segment such a video file into segments of approximately two seconds in duration.

Subsequently, each of the segments can be encoded utilizing different encoding parameters, such as encodings at different quality levels. For example, as will be known by those skilled in the art, the encoding of audio or video content is often denominated by the bit rate at which content that is encoded utilizing such an encoding must be read back in order to avoid pauses in the presentation of the content. Thus, for example, content encoded "at 300 kbps" is content whose data must be obtained at a rate of at least 300 kilobits per second in order for the content to be presented without pauses. As will also be known by those skilled in the art, the higher the bit rate of an encoding, the higher the perceived quality of that encoding, since the higher bit rate is indicative of a greater quantity of information that can more accurately represent audio or video, for example. In the example illustrated in the system 100 of FIG. 1, the encoding of the content 130 into the smooth streaming content 150, by the smooth streaming encoder 140, results in a series of segments 160, another series of segments 170 and yet another series of segments 180. The series of segments 160, comprising, for example, the segments 161, 162 and 163 that are shown in FIG. 1, can be encoded at a high bit rate, such as, for example, three megabits per second. As will be recognized by those skilled in the art, such a high bit rate can provide for high quality encoding of, for example, audio and video including, for example, what is commonly referred to as "high definition" audio and video. Another series of segments, such as the series of segments 170, comprising, for example, the segments 171, 172 and 173 that are shown in FIG. 1, can be encoded in a different bit rate than the segments 160, such as a lower bit rate. In the example illustrated in the system 100 of FIG. 1, the segments 170, including the individual segments 171, 172 and 173, for example, are shown as being encoded at 800 kilobits per second. As will also be recognized by those skilled in the art, such a mid-level bit rate can provide for a mid-level quality, such as, for example, quality commensurate with what is commonly referred to as "standard definition" audio and video. Yet another series of segments, such as the series of segments 180, comprising, for example, the segments 181, 182 and 183 that are shown in FIG. 1, can be encoded in yet another, different, bit rate such as, for example, a bit rate of 300 kilobits per second. As will again be recognized by those skilled in the art, such a low-level bit rate can provide for lower quality, including, for example, quality that would be appropriate for consumption on devices with a small display screen, for example, or devices with minimal audio capabilities.

The three different encodings shown in the smooth streaming content 150 are merely exemplary, and have been selected to provide ease of conceptualization through the use of well-known metrics. Other encodings are equally applicable and, indeed, are specifically contemplated. Likewise, the selection of three different encodings is also arbitrary and selected for ease of illustration. Greater or fewer numbers of different encodings of the content 130 are also equally applicable and, again, specifically contemplated.

In the smooth streaming content 150, individual segments are interchangeable with corresponding segments encoded utilizing different encoding parameters, such as bit rates. Thus, for example, display of the segments 161, 171, or 181, would be equivalent as to the content presented, and would only vary as to the quality of that content. Within the specific context of audio or video content, the display of the segments 161, 171, or 181 would result in the display of the same, for example, two second segment of the content 130, except that the display of that two second segment from the information contained in the segment 161 would be of higher quality then the display of that same two second segment from the information contained in the segment 171, or the information contained in the segment 181. The smooth streaming content 150 is, therefore, designed such that, should a higher quality encoding not be able to be delivered within an appropriate amount of time, a switch can be made to a lower quality encoding without any further encoding being performed by the computing device sourcing such content, since all such encodings would have already occurred as part of the operation of the smooth streaming encoder 140. Thus, for example, if a computing device was not able to receive the segment 163 within an appropriate amount of time, it could, instead, request either the segment 173, or even the segment 183, and still receive the same content, albeit encoded at a lower quality. Presentation of such content, such as, for example, to a user, would, thereby, proceed without gaps or pauses in the presentation of such content. Instead, a user may perceive changes only in the quality of the presentation.

In addition to generating the smooth streaming content 150, from the content 130, the smooth streaming encoder 140 can also generate a manifest 151 that is associated with the smooth streaming content 150 and can describe the smooth streaming content 150. For example, the manifest 151 can comprise an indication of each of the three series of segments 160, 170, and 180, the bit rates or other encoding information regarding the manner in which the different series of segments were coded, and which segments, specifically, within the series of segments 160, 170, and 180 are available in the smooth streaming content 150.

The smooth streaming content 150, together with the associated manifest 151, can be utilized to stream the content 130, such as audio or video content, to other computing devices. One mechanism in which such smooth streaming content can be utilized is within the context of wide scale distribution. For example, one or more centralized, large-scale, server computing devices could stream video content of a sporting event to multiple client computing devices. Another mechanism in which such smooth streaming content can be utilized is within the context of individualized distribution. For example, content stored on a client computing device, such as the client computing device 110, could be streamed to a dedicated video viewer that a user of the client computing device 110 could have communicationally coupled with that user's television set to enable the user to view content from the client computing device 110 on their television set. Such utilizations of the smooth streaming content can be achieved utilizing known mechanisms.

However, if a user seeks to share some content among a limited set of individuals, and a limited set of computing devices associated with those individuals, there currently exists no mechanism for facilitating such sharing. Thus, in one embodiment, as shown by the system 100 of FIG. 1, after a user has encoded some content, such as the content 130, into a smooth streaming content, such as the smooth streaming content 150, the user can retain that smooth streaming content 150 on their client computing device, such as the client computing device 110, but can enable the sharing of such content among a defined set of individuals and associated computing devices via the creation of a "channel", or other such construct, on a server computing device, such as the server computing device 120. Thus, as shown in the system 100 of FIG. 1, a user utilizing the client computing device 110 can create a channel on the server computing device 120 via the create channel action 111. In another embodiment, rather than creating the channel definition 190 on a server computing device, such as the server computing device 190, the channel definition can remain on the client computing device 110 and can be obtained by other client computing devices from the client computing device 110 through peer-to-peer communications. Such an embodiment, however, is not specifically illustrated to avoid needlessly complicating the figures.

In one embodiment, a channel can be defined by, or can otherwise comprise, a channel definition, such as the channel definition 190, which can, in turn, comprise identifications of the content being shared, and the individuals and computing devices to which such content is shared. For example, in one embodiment, a channel definition, such as the channel definition 190 shown in FIG. 1, can comprise identifications of different individuals to whom content is being shared, such as, for example, the individuals 191 and 192. Additionally, in one embodiment, individuals, such as the individuals 191 and 192 shown in FIG. 1, can themselves comprise further identifications of computing devices associated with the individuals being identified, such as, for example, the computing device 195 associated with the individual 191, or the computing devices 196 and 197 associated with the individual 192. In one embodiment, rather than specifying specific individuals, such as the individuals 191 and 192, the channel definition 190 can, instead, comprise a more flexible definition, such as, for example, by specifying that any user on a given subnetwork can have the content associated with the channel definition shared with them. In such an embodiment, a member of a family could download some smooth streaming content and other members of the family could obtain such content and view it on their computing devices by virtue of the fact that all of the family's computing devices are communicationally coupled with one another through that family's single wireless network, thereby avoiding the need to re-download such content again from external computing devices and possibly being charged for increased data usage from the network service provider that communicationally couples the family's single wireless network with other networks of computing devices.

A channel definition, such as the channel definition 190, can further comprise identification of content that is being shared through that channel. In one embodiment, such identification of content can be in the form of one or more manifests associated with the smooth streaming content. In another embodiment, such identification can be simpler, and can merely point to individual manifests saved on individual client computing devices. Thus, as shown in the system 100 of FIG. 1, in sharing the smooth streaming content 150, a user can create a channel, such as is illustrated by the channel creation action 111, and can optionally have a copy 159 of the manifest 151 copied to the server 120, as illustrated by the optional copy action 112. To signify the optional nature of the copying of the manifest 151 to the channel definition 190, as the copy 159, both the copying action 112, and the copy 159 are illustrated in FIG. 1 with short-dashed lines. Such a convention will be retained throughout the remaining figures.

In one embodiment, the channel definition 190 can reside on a server computing device 120, and individuals and computing devices identified in the channel definition 190 can be notified of the existence of a new channel, or of new content within an old channel, that has been made available to them even if the client computing device 110 is temporarily decoupled from the network 131. For example, if another client computing device were to become communicationally coupled to the network 131 and, thus, to the server computing device 120, and that other client computing device was one of the computing devices 195, 196 and 197 identified in the channel definition 190, then, upon communicationally coupling to the network 131, such other client computing device can be notified, by the server computing device 120, of the existence of the smooth streaming content 150. Alternatively, if such other client computing device had been communicationally coupled to the network 131, and, thus, to the server computing device 120, the whole time, then, upon creation of, or modification of, the channel such other computing device could have been automatically, and almost instantaneously, notified of the creation or modification.

In another embodiment, although not specifically illustrated, the channel definition 190 can reside on one or more client computing devices, such as the client computing device 110, and can be shared from those computing devices to other computing devices, such as, for example, through peer-to-peer communications. As will be recognized by those skilled in the art, existing mechanisms can be utilized to synchronize channel definitions, such as the channel definition 190, among the multiple client computing devices such that each client computing device can eventually receive an updated copy of a channel definition. Irrespective of the exact circumstances through which a client computing device is notified of the existence of the smooth streaming content 150, the notified client computing device can, either automatically, or at the initiation of a user of that other computing device, initiate either a download of the smooth streaming content 150 from the client computing device 110, such as for playback at a later time, or that notified computing device can initiate a stream of the smooth streaming content 150 for playback while that stream is being delivered to that other computing device.

Figure 2:
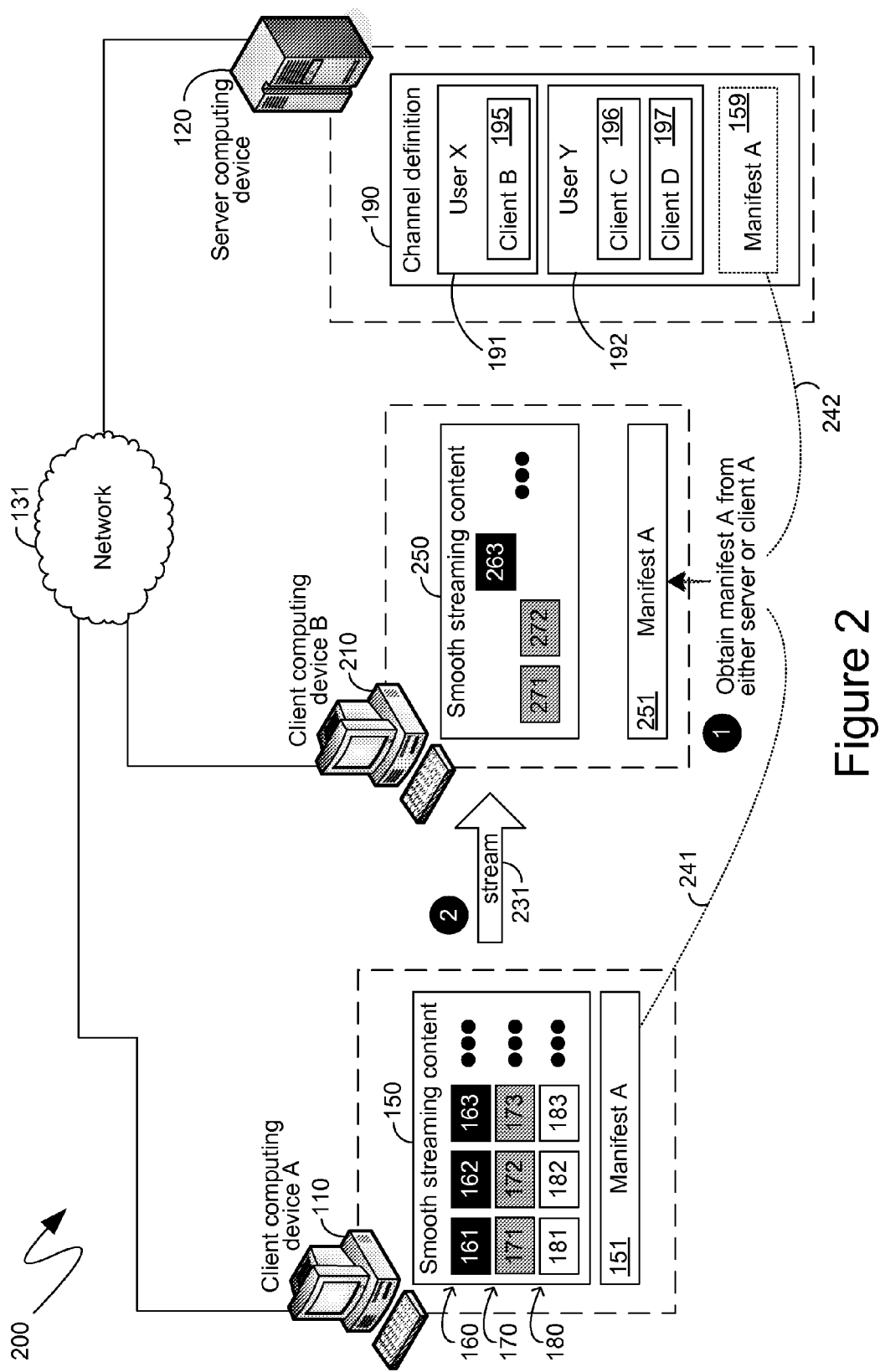
FIG. 2 is a block diagram of an exemplary transfer of content from one computing device to another.

Turning to FIG. 2, the system 200 shown therein illustrates an exemplary computing device 210 that can correspond to the computing device 195 identified in the channel definition 190, described previously. Initially, as illustrated in FIG. 2, the client computing device 210 can obtain a copy 251 of the manifest 151 that is associated with the smooth streaming content 150 being shared by the client computing device 110. If a copy 159 of the manifest 151 is part of the channel definition 190, and maintained on the server computing device 120, then, in one embodiment, the client computing device 210 can obtain its copy 251 of the manifest 151 from the server computing device 120, as illustrated by the copy action 242. Alternatively, if the channel definition 190 does not comprise a copy 159 of the manifest 151, the client computing device 210 can obtain its copy 251 of the manifest 151 directly from the client computing device 110, as illustrated by the copy action 241. Again, as before, the utilization of short-dashed lines is meant to illustrate optional alternatives.

Figure 3:
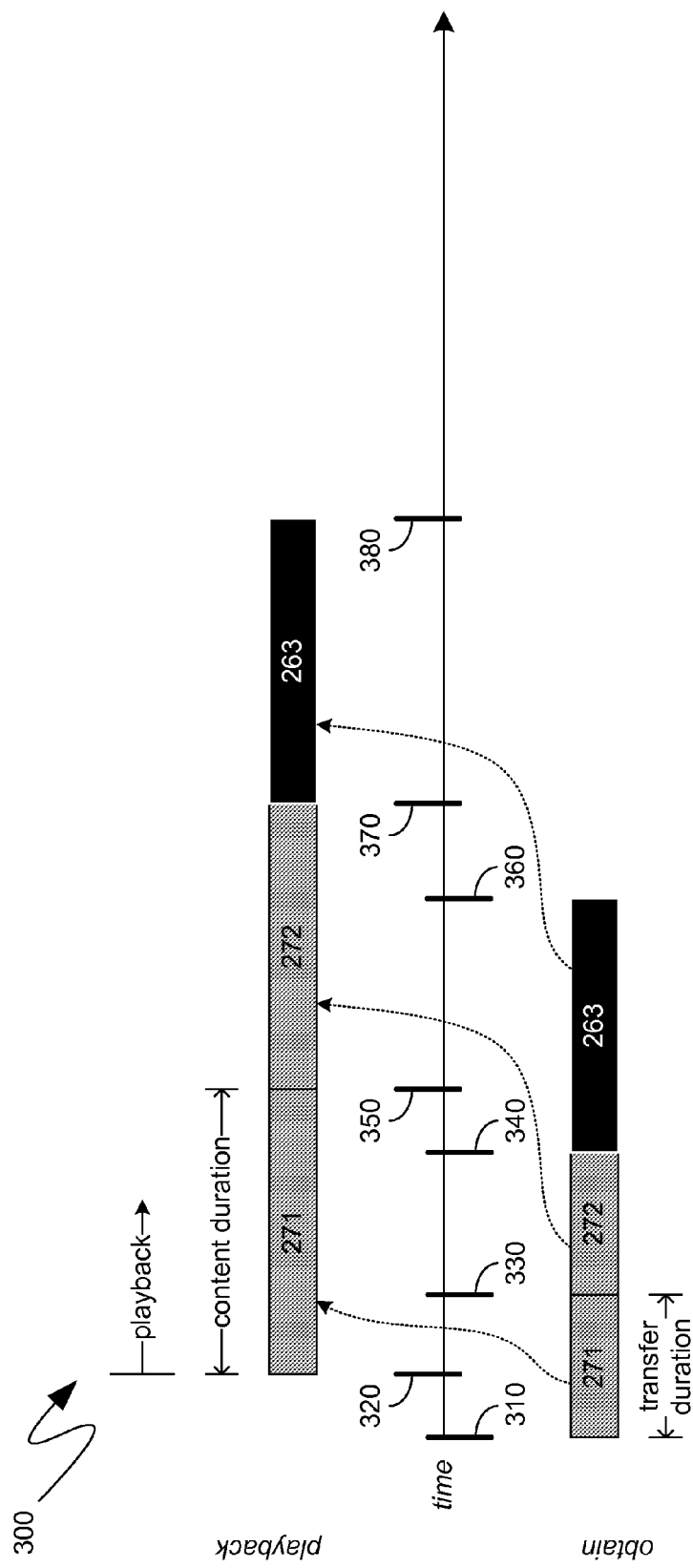
FIG. 3 is a timing diagram of an exemplary transfer and playback of content.

Once the client computing device 210 has a copy 251 of the manifest 151 it can begin to download or stream the smooth streaming content 150 from the client computing device 110. For purposes of illustration, the exemplary system 200 of FIG. 2 illustrates a streaming action 231 by which the client computing device 210 can obtain the smooth streaming content 150, from client computing device 110, such that it can be presented to a user of the client computing device 210 in an almost instantaneous manner. As illustrated, the streaming 231 of the smooth streaming content 150 from the client computing device 110 to the client computing device 210 can result in a copy 250 of the smooth streaming content 150 that can be local to the client computing device 210. However, as will be recognized by those skilled in the art, if the smooth streaming content 150 is being streamed to the client computing device 210, it is possible that not every segment of every series of segments 160, 170 and 180 of the smooth streaming content 150 will be copied to the client computing device 210. Instead, the client computing device 210 is likely to end up with a copy 250 of the smooth streaming content 150 that comprises a series of segments, such as the segments 271, 272 and 263 shown in FIG. 2, such that, for each of the segments in the copy 250, there is no other segment directed to an equivalent portion of the content, except encoded at a different bit rate. For ease of reference, individual segments, and series of segments, are numbered such that those having a 100-level numerical identifier are equivalent to those having an equivalent 200-level numerical identifier. Thus, for example, the segment 271 shown as part of the smooth streaming content 250 can be a copy of the segment 171 from the smooth streaming content 150 on the client computing device 110. Similarly, segment 272 can a copy of the segment 172, segment 263 can a copy of the segment 163, and so on The streaming of the smooth streaming content 150 to the client computing device 210 is shown in further detail by the timing diagram 300 of FIG. 3. Turning to FIG. 3, the timing diagram 300 shown therein illustrates an exemplary temporal connection between the obtaining of the data of one or more segments and the playback of that data. As indicated, the segment 271 illustrated in FIG. 3 can be a copy of the segment 171 (shown in FIG. 2) that is being transferred to the client computing device 210 (also shown in FIG. 2), from the client computing device 110 (also shown in FIG. 2). That segment 271 can be obtained by the client computing device 210 in a transfer that can commence at time 310 and end at time 330. At some point in time after the time 310, at which the obtaining of the segment 271 is commenced, a playback of the content of the segment 271 can be commenced. For example, the timing diagram 300 of FIG. 3 illustrates such a playback as commencing at time 320.

In the embodiment illustrated by the timing diagram 300 of FIG. 3, the duration of the playback of the content of the segment 271 can be longer than the duration of the transfer of the data of the segment 271. Thus, while the segment 271 can complete being transferred to the client computing device 210 at time 330, the playback of the content of the segment 271 may not complete until time 350, substantially after time 330. Similarly, while the segment 272 can start being transferred to the client computing device 210 at the time 330 that the transfer of the segment 271 has completed, the playback of the content of the segment 272 may not occur until time 350 after the playback of the content of the segment 271 has completed. Because, in the illustrated example of FIG. 3, the data of the segments 271 and 272 is being obtained by the client computing device 210 substantially more quickly than the content of those segments can be played back, the client computing device 210 can request that the segments being provided to it transition to segments encoded at a higher-quality bit rate. For example, as illustrated by the shading, the segments 271 and 272 can have been encoded at a bit rate of 800 kbps, while the segment 263 can have been encoded at a bit rate of 3 Mbps. As will be recognized by those skilled in the art, the segments 263, having been encoded at a higher bit rate, can take longer to transfer to the client computing device 210, since they comprise a greater amount of information for an equivalent duration of content. Thus, as illustrated in the timing diagram 300 of FIG. 3, the duration of the transfer of the segment 263, from the time 340 to the time 360, can be longer than the duration of the transfer of the segments 271 or 272. Nevertheless, as long as the transfer of the segment 263 completes by the time 360, prior to the time 380 at which the playback of the content of the segment 263 would complete, the client computing device 210 can continue to receive such higher quality encoded segments and continue to play them back in real-time, thereby continuing to stream the smooth streaming content 150 at the higher quality encoding. Should the time taken to transfer the segments to the client computing device 210 begin increasing, such as, for example, due to network congestion or other communicational difficulties, the segments being transferred to the client computing device 210 can again transition, except now to a lower quality encoding whose equivalent-duration segments would comprise less information and would, therefore, transfer more quickly.

Figure 4:
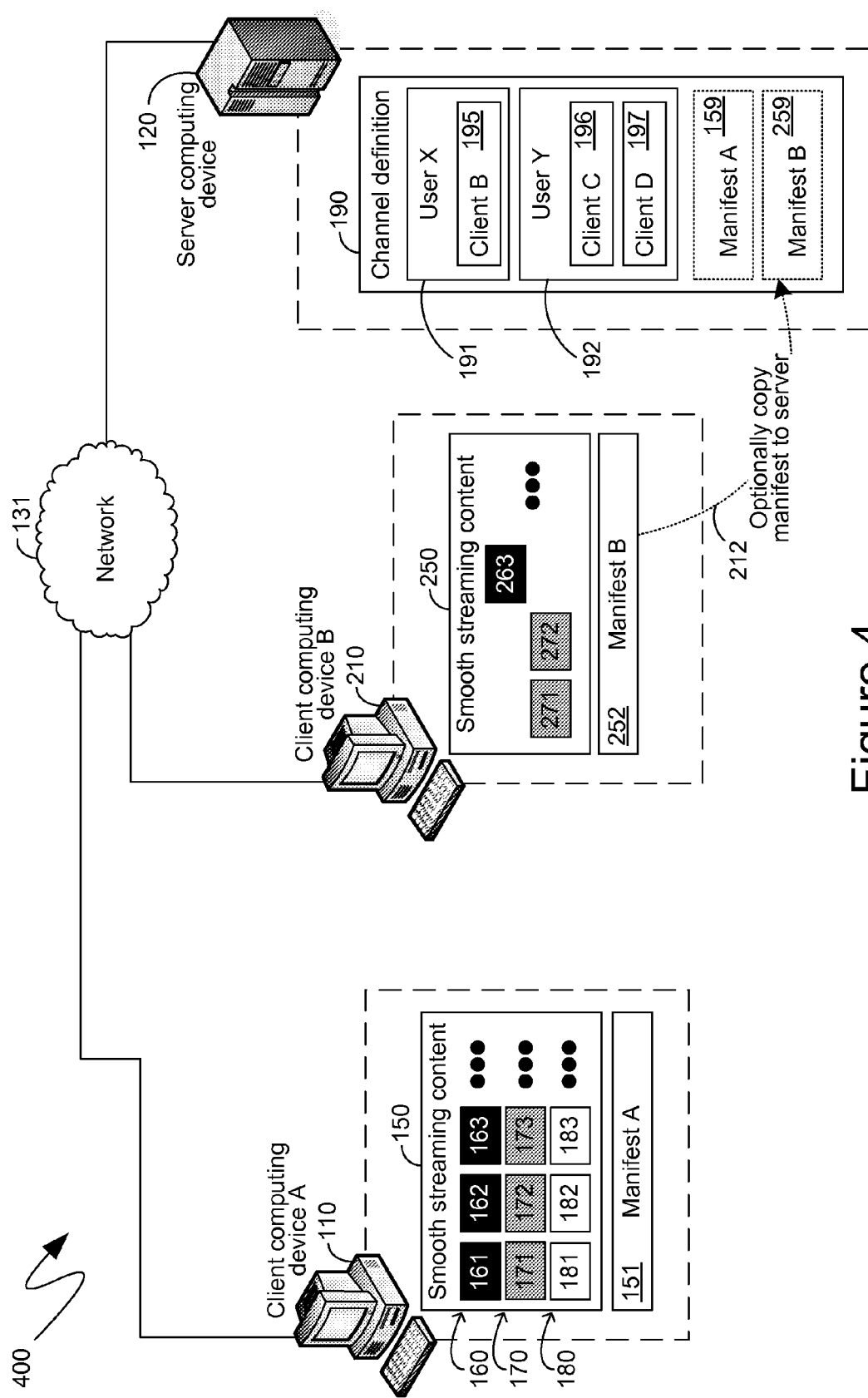
FIG. 4 is a block diagram of another aspect of an exemplary transfer of content from one computing device to another.

Turning to FIG. 4, as shown in the system 400 illustrated therein, once the smooth streaming content 150 has been streamed to the client computing device 210, from the client computing device 110, the copy 250 of that smooth streaming content 150 can be complete, and the client computing device 210 can generate its own manifest 252 to be associated with that copy 250. The manifest 252 can comprise information regarding the segments, their associated bit rates, and other relevant information about the copy 250 of the smooth streaming content 150. In one embodiment, as indicated previously, if the channel definition 190 comprises copies of the manifests, then a copy 259 of the manifest 252 can be optionally provided to the server computing device 120 by the client computing device 210, as illustrated by the optional action 212.

In another embodiment, the streaming or downloading of the smooth streaming content 150 can be accelerated if client multiple computing devices can source the smooth streaming content 150. Thus, for example, if another computing device, from among the computing devices identified in the channel definition 190, were to become communicationally coupled with the network 131, that other computing device could obtain the smooth streaming content 150 both from the client computing device 110, and from the copy 250 now locally stored on the client computing device 210. In such a manner, even if the client computing devices 110 and 210 were limited in their ability to send information across the network 131, such as by the network service provider through which such client computing devices are communicationally coupled with the network 131, a third client computing device could obtain portions of the smooth streaming content 150, alternatively, from both the client computing device 110 and from the copy 250 on the client computing device 210, thereby effectively increasing the quantity of information that could be received by such a third client computing device beyond that of the ability of any one of the client computing devices 110 and 210 to source such information.

Figure 5:
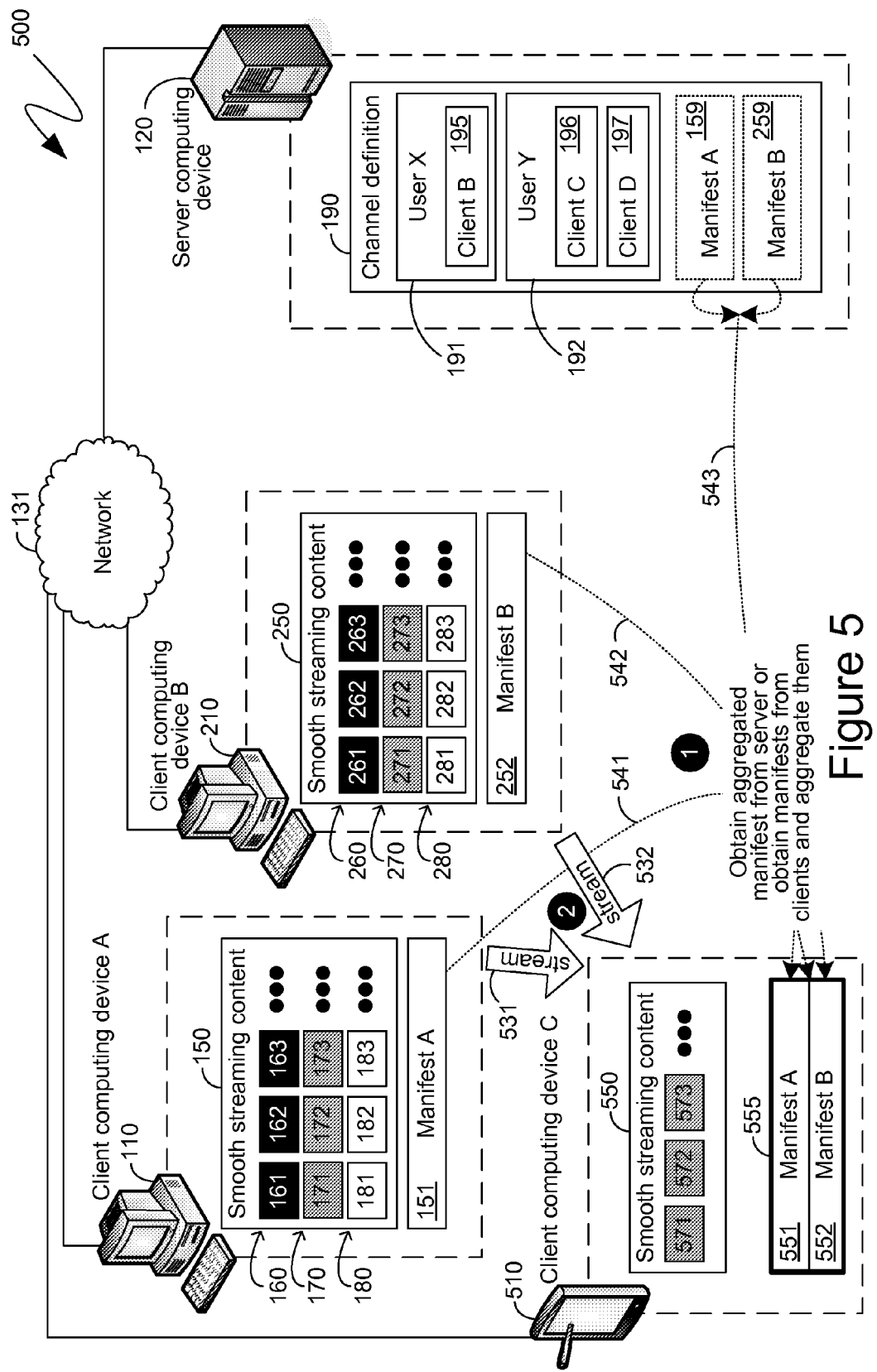
FIG. 5 is a block diagram of an exemplary transfer of content from multiple computing devices to one computing device.

Turning to FIG. 5, the system 500 shown therein illustrates another exemplary client computing device, namely the client computing device 510, being communicationally coupled to the network 131. The client computing device 510 can be, for example, one of the client computing devices 196 and 197 identified in the channel definition 190. As such, the client computing device 510 can be notified of the smooth streaming content 150 that has been made available via the channel definition 190. Initially, as shown in the system 500 of FIG. 5, the client computing device 510 can obtain copies 551 and 552 of the manifest 151 and the manifest 252, respectively. As before, the client computing device 510 can obtain the copies 551 and 552 either from the client computing devices 110 and 210, respectively, as illustrated by the communications 541 and 542, respectively, or from the server computing device 120, if copies 159 and 259 of the manifests were maintained as part of the channel definition 190, as illustrated by the communication 543. Again, as before, the short-dashed lines shown in FIG. 5 are meant to illustrate optional alternatives.

In one embodiment, as illustrated by their co-joining in the system 500 of FIG. 5, the copies 551 and 552 of the manifests 151 and 252, respectively, can be aggregated into a single aggregated manifest 555 that can describe the smooth streaming content 150 on the client computing device 110 and the copy 250 of the smooth streaming content on the client computing device 210. In one embodiment, the aggregated manifest 555 can be generated by the client computing device 510 after the client computing device 510 either obtains the copies 551 and 552 from the client computing devices 110 and 210, respectively, or after the client computing device hardware 510 obtains the copies 551 and 552 from the server computing device 120. In an alternative embodiment, the aggregated manifest 555 can be generated by the server computing device 120 and can be transmitted, as such, to the client computing device 510, such as, for example, via the communication 543.

An aggregated manifest, such as the aggregated manifest 555 generated from the copies 551 and 552, can comprise information about any copies of the smooth streaming content 150 that may be currently available via the network 131. Thus, for example, if the client computing device 110 were communicationally decoupled from the network 131, the aggregated manifest 555 of the client computing device 510 could comprise only the copy of the manifest 552 of the smooth streaming content 250 on the client computing device 210, and could not comprise any information about the smooth streaming content 150 on the client computing device 110, since the client computing device 110 could be no longer be communicated with. In one embodiment, changes to the aggregated manifest 555 can be made in real-time as other client computing devices, such as the client computing device 110 and the client computing device 210, either become communicationally coupled with the network 131, or become communicationally disconnected from the network 131. Again, such real-time changes can be made by either the client computing device 110 itself, or by the server computing device 120, and then transmitted to the client computing device 510. In an alternative embodiment, once an aggregated manifest, such as the aggregated manifest 555, is generated for a particular piece of content, that aggregated manifest can remain until the client computing device, such as the client computing device 510, has completed obtaining such content. In such an alternative embodiment, if one of the other client computing devices, such as the client computing device 110 or the client computing device 210, become communicationally disconnected from the network 131, then attempts, such as by the client computing device 510, to reach such a disconnected client computing device can fail, and processing can proceed in accordance with the mechanisms described in detail below in dealing with network failures.

Returning back to the example illustrated in the system 500 of FIG. 5, the aggregated manifest on the client computing device 510, comprises information from the copies 551 and 552 of the manifests 151 and 252, respectively, and, as such, identifies, to the client computing device 510, details regarding the smooth streaming content 150 and the copy of the smooth streaming content 250 located, respectively, on the client computing devices 110 and 210. As such, the client computing device 510 can select to stream the smooth streaming content simultaneously from both the smooth streaming content 150 on the client computing device 110 and the copy of the smooth streaming content 250 on the client computing device 210, as illustrated by the streaming actions 531 and 532, respectively.

To illustrate the streaming, or downloading, of smooth streaming content from multiple client computing devices simultaneously, the copy 250 on the client computing device 210 is shown as comprising a series of segments 260, another series of segments 270, and yet another series of segments 280 that can be analogous to the series of segments 160, the series of segments 170, and the series of segments 180 described previously. In one embodiment, although the copy 250 of the smooth streaming content 150 originally comprised only the specific segments that were streamed to the client computing device 210, such as during the streaming action 231 (shown in FIG. 2) that was described previously, a subsequent downloading can enable the client computing device 210 to obtain the remaining segments. For example, automated mechanisms, such as synchronization mechanisms, can be executed periodically on each of the client computing devices, such as the client computing device 110 and the client computing device 210, to ensure that each computing device has a complete copy of any content that is being shared to the other computing devices, such as, for example, any content that is identified by the channel definition 190. Such automated mechanisms can compare the individual segments in the copy 250 of the smooth streaming content 150 to the smooth streaming content 150, and then copy over to the copy 250 on the client computing device 210 any segments from the smooth streaming content 150 on the client computing device 110 that were not already present in the copy 250. Alternatively, rather than relying upon automated mechanisms, a user of the client computing device 210 can initiate, or otherwise enable, such subsequent completion downloading by, for example, selecting an appropriate option when initiating the streaming action 231 (shown in FIG. 2), or otherwise providing an explicit such instruction after the streaming has completed.

Irrespective of the mechanism by which the remaining segments are copied to, for example, the client computing device 210, the copy 250 of the smooth streaming content 150 is shown in the system 500 of FIG. 5 as comprising equivalent segments to those contained in the smooth streaming content 150. As before, for ease of reference, individual segments, and series of segments, are numbered such that those having a 100-level numerical identifier are equivalent to those having an equivalent 200-level numerical identifier. Thus, for example, segment 261 is a copy of the segment 161, segment 271 is a copy of the segment 171, the series of segments 280 is a copy of the series of segments 180, and so on. Similarly, individual segments that are numbered as having a 500-level numerical identifier are equivalent to those having an equivalent 100-level and 200-level numerical identifier. Thus, for example, the segment 571 is a copy of either the segment 261 or the segment 161, the segment 572 is a copy of either the segment 262 or the segment 162, and so on.

In one embodiment, the client computing device 510 can be a tablet-based computing device, or other like computing device that may not necessarily comprise equivalent processing or display hardware as the more general-purpose client computing devices 110 and 210. Thus, while the client computing devices 110 and 210 can have benefited from receiving segments encoded in a high quality manner, such as, for example, the series of segments 160 and 260, the client computing device 510 may not necessarily comprise sufficient processing capability to process such segments or, it may not comprise sufficient display hardware such that the additional quality provided by, for example, the series of segments 160 and 260 may not be capable of being realized. Consequently, the client computing device 510 need not attempt to obtain copies of, for example, any of the segments of the series of segments 160 and 260, and can, instead, only request copies of segments that were encoded with lower quality, such as, for example, the series of segments 170 and 270. To illustrate such an embodiment, the copy 550, of the smooth streaming content 150, that is resident on the client computing device 510, and that is a result of the streaming actions 531 and 532, is shown as being comprised of segments 571, 572 and 573 that can, as illustrated by the shading, be segments that were encoded at, for example, a bit rate of 800 kbps.

Because the aggregated manifest 555, on the client computing device 510, can comprise information regarding the segments available from both the smooth streaming content 150, on the client computing device 110, and the copy 250, on the client computing device 210, the client computing device 510 can utilize such information to alternate the obtaining of content and, thereby, receive content more quickly than it could from either the client computing device 110, or the client computing device 210, individually. For example, the network service providers that enable the client computing device 110 and the client computing device 210 to communicationally couple with the network 131 can limit the amount of information that can be transmitted by those client computing devices such that a receiving computing device, such as the client computing device 510, may have an ability to receive information from the network 131 at a rate substantially greater than the rate at which either of the client computing devices 110 or 210, individually, can transmit information to the network 131. As another example, the network service providers that enable the client computing devices 110 and 210 to communicationally couple with the network 131 may charge based on how much information either of those client computing devices either sends or receives via the network 131. Under either example, there can be benefits to having the client computing device 510 interleave the receipt of segments of the smooth streaming content from any available client computing device that comprises such content, such as, for example, the client computing devices 110 and 210.

Figure 6:
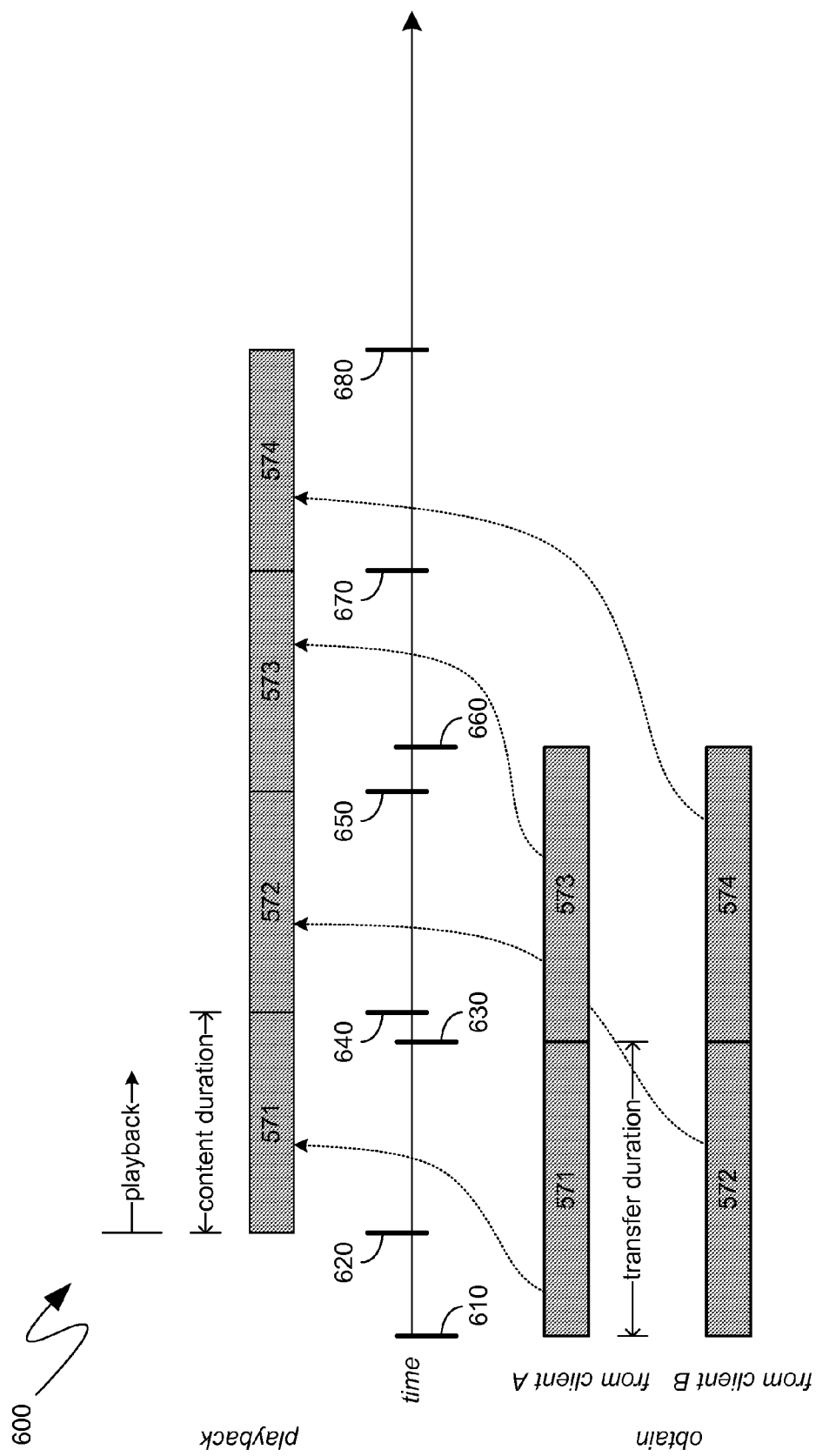
FIG. 6 is a timing diagram of an exemplary transfer of content that is being obtained from multiple computing devices.

Turning to FIG. 6, the timing diagram 600 illustrated therein shows an exemplary manner in which, for example, the client computing device 510 (shown in FIG. 5) can receive segments from both the client computing devices 110 and 210 (both also shown in FIG. 5) and, thereby, benefit from the combined ability of those client computing devices to source data across, for example, the network 131 (also shown in FIG. 5). For example, as illustrated in the timing diagram 600 of FIG. 6, the client computing device 510 can initiate transfer of interleaving segments simultaneously from the client computing devices 110 and 210. As before, segments with 500-level numerical identifiers are equivalent to those having equivalent 100-level and 200-level numerical identifiers. Thus, for example, the segment 571 illustrated in FIG. 6 can be a copy of the segment 171 (shown in FIG. 5) that is being transferred to the client computing device 510 from the client computing device 110 and the segment 572 can be a copy of the segment 272 (shown in FIG. 5) that is being transferred to the client computing device 510 from the client computing device 210. As illustrated, both the transfer of the segment 571, being received from the client computing device 110, and the transfer of the segment 572, being received from the client computing device 210, can be commenced at the same time, namely the time 610.

After at least a portion of the segment 571 has been obtained by the client computing device 510, the computing device 510 can commence playback of the segment 571, such as, for example, at a time 620 after the time 610, as shown by the timing diagram 600 of FIG. 6. As explained previously, the playback of any segment should not complete until the transfer of the data comprising that segment has completed. However, in the example illustrated in FIG. 6, the transfer duration for a particular segment can be longer than the time taken to playback the content of that segment. Thus, for example, if the segments were being obtained from a single client computing device, the completion of the second segment at the time 660 would be after the playback of that second segment would have already ended at time 650, thereby resulting in a pause in the playback of the content being streamed to the client computing device 510. However, because the segments are being obtained simultaneously from multiple client computing devices, the content can be properly played back despite the fact that, again in the illustrated example, the amount of time taken to playback a segment is less than the amount of time taken to obtain the data of that segment.

More specifically, within the context of the example illustrated by the timing diagram 600 of FIG. 6, the segment 571, being obtained from the client computing device 110, can end at time 630. Subsequently, rather than obtaining segment 572 from the client computing device 110, in one embodiment, the client computing device 510 can request a copy of the segment 173, which would be received as the segment 573. The receipt of the segment 573 can commence at time 630 and complete by time 660. Simultaneously, however, the client computing device 510 can be receiving the segment 572 from the client computing device 200. Thus, at approximately the same time, such as the time 630, that the client computing device 510 has completed receiving segment 571 from the client computing device 110, it can also have completed receiving the segment 572 from the client computing device 210. Similarly, rather than obtaining segment 573 from the client computing device 210, in one embodiment the client computing device 510 can request a copy of the segment 274, which would be received as the segment 574. The segment 573, being received from the client computing device 110, and the segment 574, being received from the client computing device 210, can, again, both commence at approximately the same time, such as, for example, at time 630, and can, likewise, end at approximately the same time, such as, for example, at time 660.

From the perspective of the playback of the received segments 571, 572, 573 and 574 that are illustrated in the timing diagram 600 of FIG. 6, as described previously, playback of the segment 571 can commence at time 620 and can end by time 640. At time 630, however, prior to time 640, the obtaining of the data of the segment 572, since it was being obtained in parallel to the obtaining of the data of the segment 571, can also have completed. Thus, when playback, at time 640, is ready to play back the segment 572, such a segment can already have been obtained. Likewise, when the playback of the segment 572 ends at time 650, and playback of the segment 573 is ready to commence, the segment 573 can, at time 650, already have been mostly obtained, the remainder of which can be completed by time 660, prior to the completion of the playback of the segment 573 at the time 670. Again, however, since the segment 574 was being obtained in parallel to the segment 573, the segment 574 can have been fully obtained by time 660 and can be ready for playback at the subsequent time 670, at which point the playback of the segment 573 can complete. In such a manner, although no one client computing device can source segments sufficiently quickly to enable streaming playback of those segments, the client computing device 510 can still stream the segments 571, 572, 573, 574, and so on, by interleaving the obtaining of those segments from the available client computing devices, such as, for example, computing devices 110 and 210.

Figure 7:
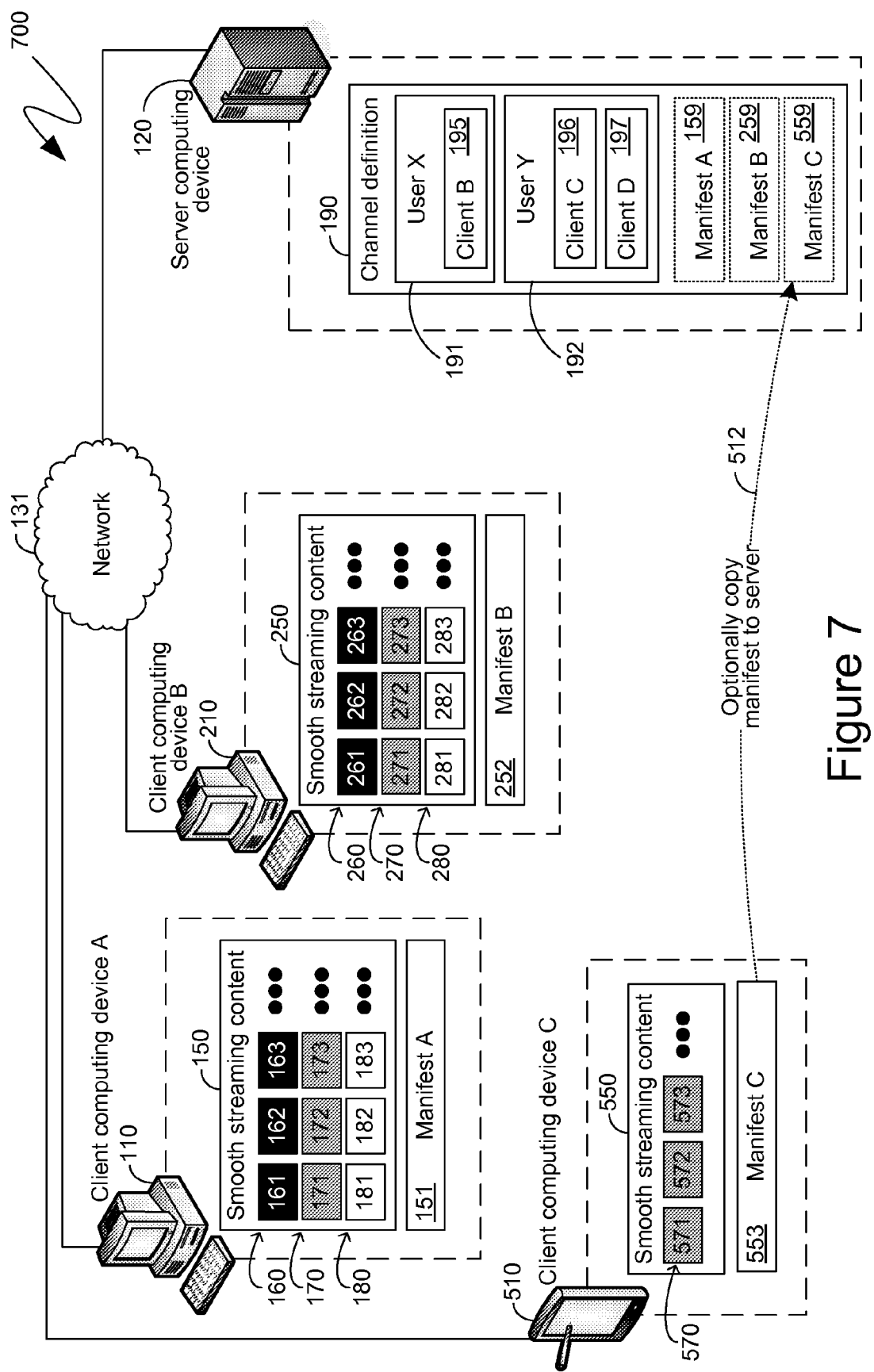
FIG. 7 is a block diagram of another aspect of an exemplary transfer of content from multiple computing devices to one computing device.

Turning to FIG. 7, as illustrated by the system 700 shown therein, once the client computing device 510 has completed obtaining its copy 550 of the smooth streaming content 150, which copy can comprise the series of segments 570, a portion of the obtaining of which was described in detail above, the client computing device 510 can generate a manifest 553 that can correspond to this copy 550. Optionally, then, as before, the manifest 553 can be copied into the channel definition 190 being maintained by the server computing device 120, as illustrated by the optional copy action 512.

Figure 8:
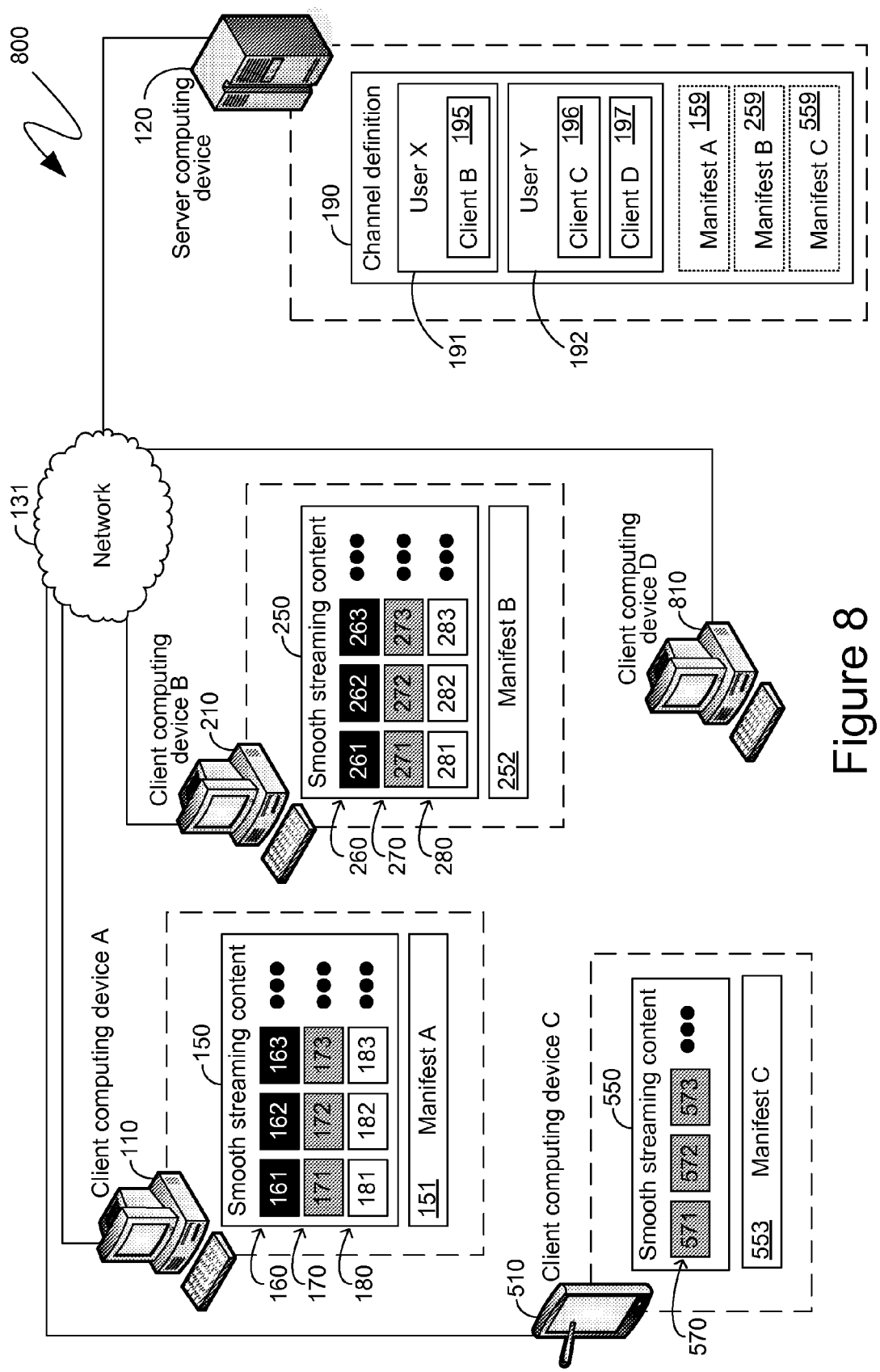
FIG. 8 is a block diagram of a network within which content can be transferred from multiple computing devices to one computing device.

Turning to FIG. 8, the system 800 shown therein illustrates another client computing device, such as the client computing device 810, which can be the client computing device 197 that was identified in the channel definition 190, becoming communicationally coupled with the network 131. Although not specifically illustrated in FIG. 8, the client computing device 810 can, such as in the manner described in detail above, obtain, either from the server computing device 120, or by generating it itself, an aggregated manifest comprising the information from the manifest 151 on the client computing device 110, the manifest 252 on the client computing device 210, and the manifest 553 on the client computing device 510. Based on the information contained in such an aggregated manifest, the client computing device 810 can then select to obtain one or more segments of the smooth streaming content from either the smooth streaming content 150 on the client computing device 110, the smooth streaming content 250 on the client computing device 210 or the smooth streaming content 550 on the client computing device 510. As before, such an obtaining of content can be performed in parallel, such that interleaving segments can be obtained from each available client computing device that comprises the requested segments.

Figure 9:
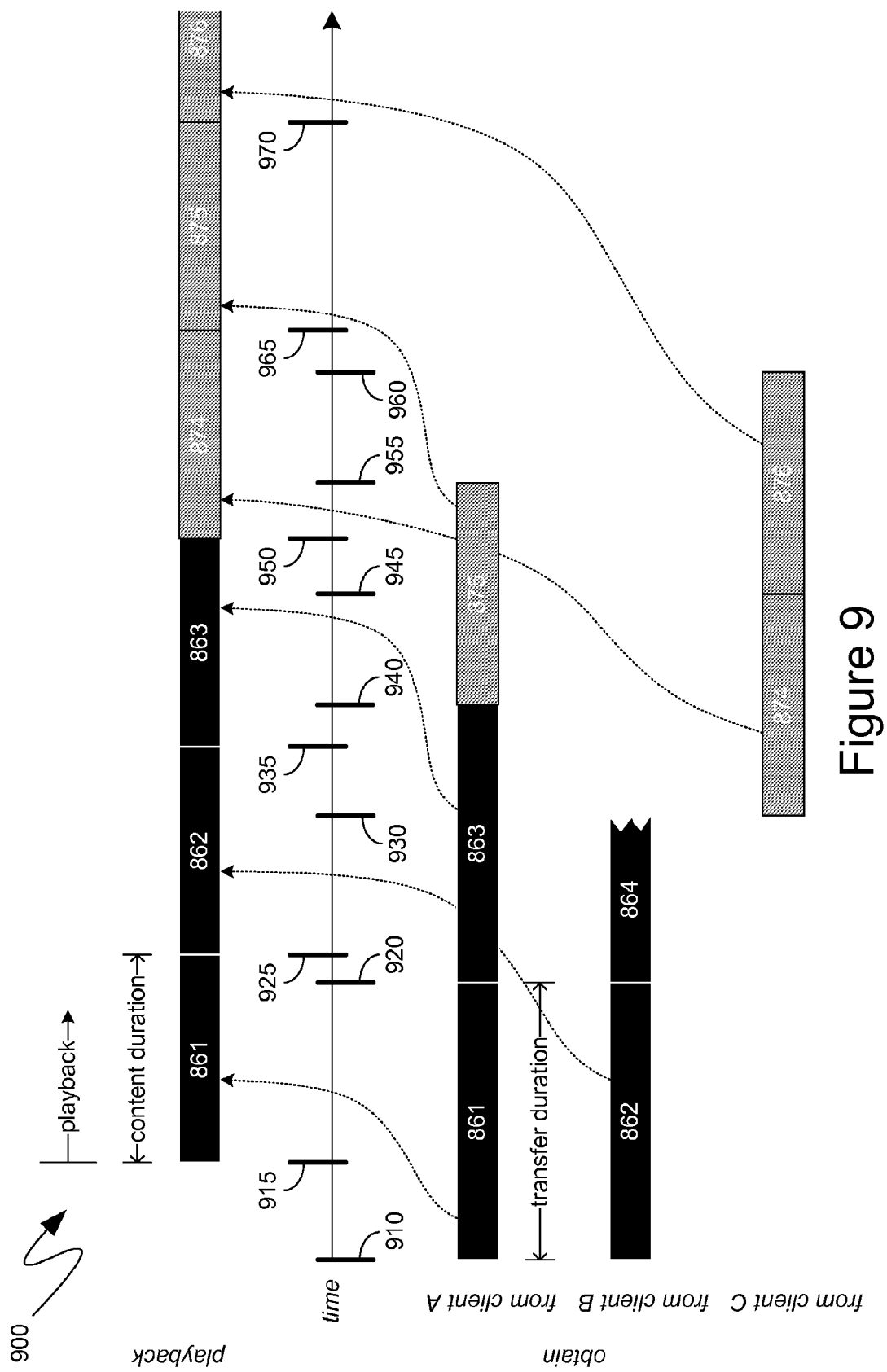
FIG. 9 is a timing diagram of another exemplary transfer and playback of content that is being obtained from multiple computing devices.

Turning to FIG. 9, a timing diagram 900 shown therein illustrates an exemplary obtaining of some of the segments by the client computing device 810 (shown in FIG. 8). In the exemplary embodiment illustrated by the timing diagram 900 of FIG. 9, the client computing device 810 can initially attempt to stream high-quality packets, such as the 3 Mbps packets, as illustrated by the shading. As before, segments with 800-level numerical identifiers are equivalent to those having equivalent 100-level, 200-level and 500-level numerical identifiers. Thus, for example, the segment 861 illustrated in FIG. 9 can be a copy of the segment 161 (shown in FIG. 8) that is being transferred to the client computing device 810 from the client computing device 110 (also shown in FIG. 8), the segment 862 can be a copy of the segment 262 (also shown in FIG. 8) that is being transferred to the client computing device 810 from the client computing device 210 (also shown in FIG. 8), and the segment 874 can be a copy of a segment (not previously illustrated) that is being transferred to the client computing device 810 from the client computing device 510 (also shown in FIG. 8). As illustrated, both the transfer of the segment 861, being received from the client computing device 110, and the transfer of the segment 862, being received from the client computing device 210, can be commenced at the same time, namely the time 910, in a manner analogous to that described in detail above. As will be recognized by those skilled in the art, initially, the client computing device 810 can select to not obtain segments from the client computing device 510 because the higher-quality segments that the client computing device 810 is seeking may not be available from the client computing device 510, such as would have been indicated to the client computing device 810 by the aggregated manifest.

Initially, as illustrated by the timing diagram 900 of FIG. 9, the client computing device 810 can receive the segments 861, 862 and 863 from the client computing devices 110 and 210 in an interleaving manner, such as that described in detail above. Thus, the receipt of the segments 861 and 862 can commence at time 910 and can complete at approximately time 920, while the playback of the segment 861 can commence at time 915 and can end at time 925, at which point the playback of the segment 862 can commence, which can end at time 935. However, in the illustrated embodiment, at approximately time 930, communications from the client computing device 210 can be interrupted, such as is illustrated by the partially received segment 864. As illustrated, the amount of time required for the client computing device 810 to receive a segment from one of the client computing devices 110 or 210 can be greater than the amount of time that will be utilized in playing back the content of that segment. Consequently, when the communications from the client computing device 210 are interrupted at approximately time 930, the client computing device 810 can determine, based upon available information, that it can no longer receive the high-quality segments from only a single client computing device, such as the client computing device 110, at a sufficient rate to continue to playback the content of those segments without pauses or gaps. Consequently, the client computing device 810 can request segments that can have been encoded at a lower quality and can, thereby, comprise less information and be transferred more quickly.

In one embodiment, the client computing device 810 can, based upon the aggregated manifest, determine that the client computing device 510 can now be a viable computing device from which to receive the mid-level quality segments. Thus, as shown in the timing diagram 900 of FIG. 9, a replacement mid-level quality segment 874, for the partially received high quality segment 864, can be requested from, and obtained from, the client computing device 510. Such a segment 874 can commence being obtained from the client computing device 510 at approximately the time 930 at which the communications with the client computing device 210 failed. Consequently, because of the availability of another client computing device, such as the client computing device 510, the client computing device 810 need not wait until time 940, when the obtaining of the segment 863 that was in process at the time 930 when the obtaining of the segment 864 failed, to request a replacement for the partially obtained segment 864.

The obtaining of the segment 874 can be completed by time 945 and, at time 945, another segment, such as the segment 876, can be obtained from the client computing device 510. That obtaining can complete by time 960. Meanwhile, the playback of the content can continue with the playback of the segment 862 ending at time 935, and playback of the segment 863 commencing at approximately time 935 and ending at time 950 after the completion of the obtaining of the data of the segment 863 at time 940. Starting at approximately time 940, the client computing device 810 can transition to requesting mid-level quality segments from the client computing device 100, such as, for example, the segment 875 that can be received between the time 940 and the time 955.

At the time 950, upon the completion of the playback of the segment 863, the playback of the subsequent segment, namely the segment 874, can commence. At that time, the user may perceive a degradation in the quality of the playback, but the user should not experience any pauses or gaps in the playback. The playback of the segment 874 to complete by the time 965, by which point in time the receipt of the subsequent segment, namely the segment 875, can have already completed, and its playback can commence at approximately time 965. Similarly, by time 970, the playback of the segment 875 can have completed, and the segment 876, which can have been fully received by the prior time 960, can be ready to be played back. In such a manner, with reference to the aggregated manifest, a client computing device can dynamically select from among available other client computing devices, and available packets on those client computing devices, to obtain content in an efficient manner to prevent pauses or gaps in the playback of that content.

Figure 10:
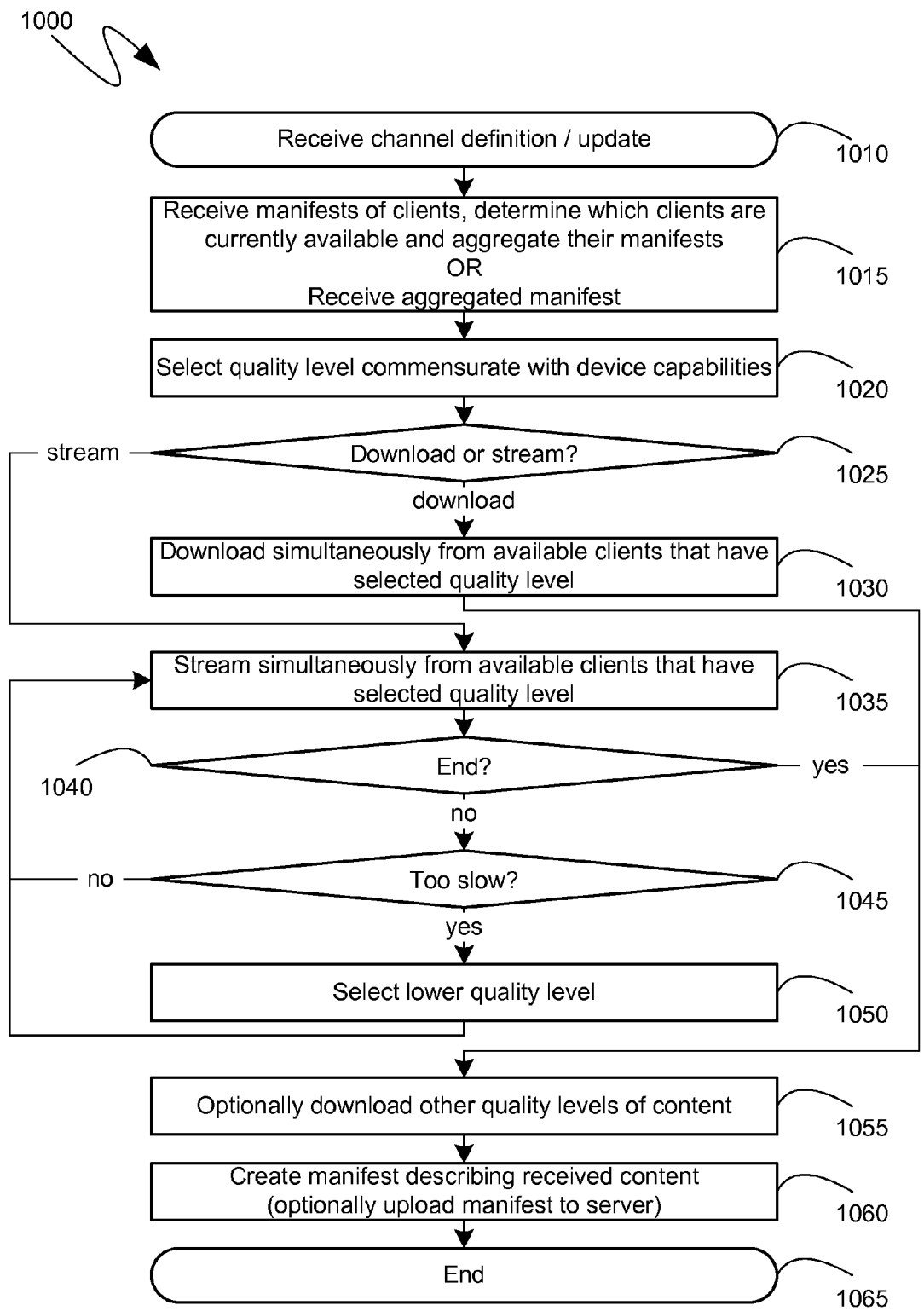
FIG. 10 is a flow diagram of an exemplary mechanism for obtaining content from multiple computing devices.

Turning to FIG. 10, one exemplary operation of a client computing device receiving content is illustrated by the flow diagram 1000 shown in FIG. 10. Initially, at step 1010, a client computing device can receive a channel definition, or an update to a channel definition, indicating that new content is available, or is otherwise being shared among a defined group of users and client computing devices, of which that client computing device is a member. Subsequently, at step 1015, the client computing device can either receive individual manifests of available clients, such as, for example, by receiving the manifests from the clients themselves, or by receiving copies of the manifests from a server computing device, and can then generate an aggregated manifest, or, alternatively, the client computing device can receive an already aggregated manifest that can have been generated by, for example, the server computing device. At step 1020, the client computing device can select a quality level, from among the encodings of various segments that are indicated by the aggregated manifest as being currently available, that are commensurate with the device's capabilities. For example, as indicated previously, if the client computing device is a computing device that either cannot process, or cannot properly display, high-quality content, then the client computing device can select a mid-level quality or low-level quality encoded segments. A cellular telephone, for example, may only need to select low-level quality encoded segments, while portable tablet computers may select mid-level quality encoded segments.

Once, at step 1020, the client computing device has selected a quality level, it can decide, at step 1025, whether to download the segments of the content at that quality level for subsequent presentation, or whether to stream the packets for more immediate presentation. As will be recognized by those skilled in the art, the decision, at step 1025, can be performed via input from the user, such as through a user interface selection mechanism. If, at step 1025, it is determined that the content will be downloaded, then at step 1030, the aggregated manifest from step 1015 can be referenced to identify available clients that have segments at the quality level selected at step 1020 and, at step 1030, those clients can be contacted and those segments can be requested, such as in the interleaving manner described in detail above. Once the download is complete, processing can proceed to step 1055, at which point other quality levels of content can be optionally downloaded, such as, for example, to enable the client computing device to act as a source for such quality levels even if it cannot, itself, utilize them. As before, such an optional action, at step 1055, can be performed with reference to decisions made by a user, such as through a user interface selection mechanism. Subsequently, at step 1060, the client computing device can create a manifest of its own describing the content that it has received. For example, if the received content was streamed, it is possible that certain segments of one quality encoding were received together with other segments of a different quality encoding. The manifest created at step 1060 can indicate exactly which segments, and which quality levels, are currently available from the client computing device. Optionally, at step 1060, the manifest that was created can be uploaded to a server computing device. The relevant processing can then end at step 1065.

If, however, at step 1025, it was determined that the content is to be streamed, then processing can proceed to step 1035, at which point the aggregated manifest from step 1015 can be referenced to identify available clients that have segments at the quality level selected at step 1020 and, at step 1030, those clients can be contacted and those segments can be requested, such as in the interleaving manner described in detail above. At step 1040, a determination can be made as to whether all of the relevant content has been streamed. If, at step 1040, it is determined that the content has reached its end, then processing can proceed with step 1055, as described in detail above. If, however, at step 1040, it is determined that additional content remains to be streamed, a subsequent determination, at step 1045, can be made to determine whether the segments that are being received are arriving too slowly to adequately stream the content. If, at step 1045, it is determined that the segments are not arriving too slowly, then processing can return to step 1035 and further segments can be requested and received from available clients at that time. If, however, at step 1045, it is determined that the segments are arriving too slowly, then, at step 1050, a lower quality level encoding can be selected, and processing can again return to step 1035 to obtain segments encoded in such a lower quality level encoding from clients that are available at that time.

Figure 11:
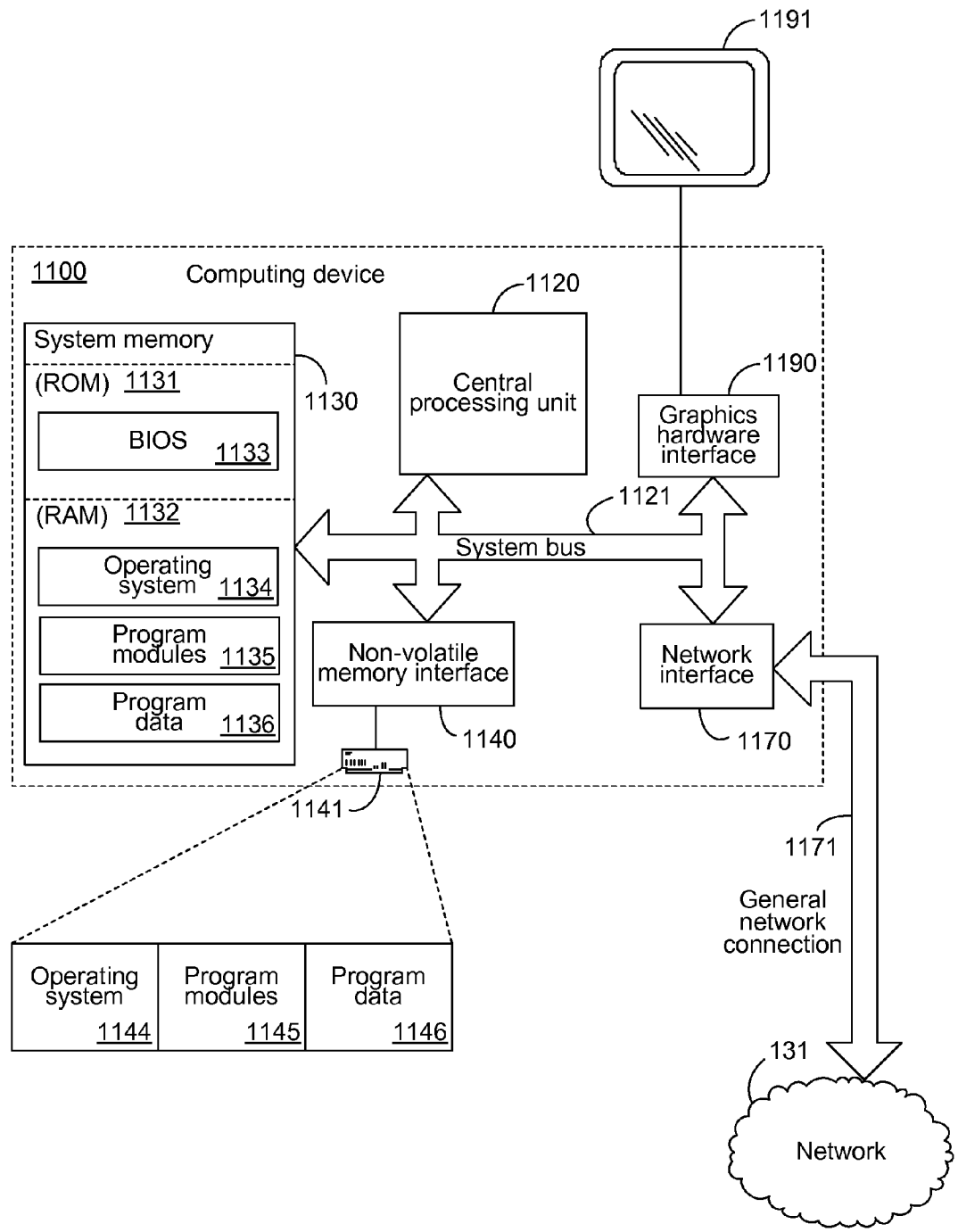
FIG. 11 is a block diagram of an exemplary computing device.

Turning to FIG. 11, an exemplary computing device 1100 is illustrated. The exemplary computing device 1100 can be any one or more of the client computing devices 110, 210, 510 and 810, or the server computing device 120 illustrated in the previously referenced Figures, whose operations were described in detail above. Similarly, the exemplary computing device 1100 can be a computing device that can be executing one or more processes that can represent the client computing devices 110, 210, 510 and 810, or the server computing device 120, such as, for example, by executing one or more processes that create virtual computing environments that can provide for the operations detailed above in connection with the client computing devices 110, 210, 510 and 810 and the server computing device 120. The exemplary computing device 1100 of FIG. 11 can include, but is not limited to, one or more central processing units (CPUs) 1120, a system memory 1130, that can include RAM 1132, and a system bus 1121 that couples various system components including the system memory to the processing unit 1120. The system bus 1121 may be any of several types of bus structures including a memory bus or memory controller, a peripheral bus, and a local bus using any of a variety of bus architectures. The computing device 1100 can optionally include graphics hardware, such as for the display of visual user interfaces, including, but not limited to, a graphics hardware interface 1190 and a display device 1191. Depending on the specific physical implementation, one or more of the CPUs 1120, the system memory 1130 and other components of the computing device 1100 can be physically co-located, such as on a single chip. In such a case, some or all of the system bus 1121 can be nothing more than silicon pathways within a single chip structure and its illustration in FIG. 11 can be nothing more than notational convenience for the purpose of illustration.

The computing device 1100 also typically includes computer readable media, which can include any available media that can be accessed by computing device 1100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 1100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1130 includes computer storage media in the form of volatile and/or nonvolatile memory such as read only memory (ROM) 1131 and the aforementioned RAM 1132. A basic input/output system 1133 (BIOS), containing the basic routines that help to transfer information between elements within computing device 1100, such as during start-up, is typically stored in ROM 1131. RAM 1132 typically contains data and/or program modules that are immediately accessible to and/or presently being operated on by processing unit 1120. By way of example, and not limitation, FIG. 11 illustrates the operating system 1134 along with other program modules 1135, and program data 1136.

The computing device 1100 may also include other removable/non-removable, volatile/nonvolatile computer storage media. By way of example only, FIG. 11 illustrates the hard disk drive 1141 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140.

The drives and their associated computer storage media discussed above and illustrated in FIG. 11, provide storage of computer readable instructions, data structures, program modules and other data for the computing device 1100. In FIG. 11, for example, hard disk drive 1141 is illustrated as storing operating system 1144, other program modules 1145, and program data 1146. Note that these components can either be the same as or different from operating system 1134, other program modules 1135 and program data 1136. Operating system 1144, other program modules 1145 and program data 1146 are given different numbers hereto illustrate that, at a minimum, they are different copies.

The computing device 1100 can operate in a networked environment using logical connections to one or more remote computers. The computing device 1100 is illustrated as being connected to the general network connection 1171 through a network interface or adapter 1170 which is, in turn, connected to the system bus 1121. In a networked environment, program modules depicted relative to the computing device 1100, or portions or peripherals thereof, may be stored in the memory of one or more other computing devices that are communicatively coupled to the computing device 1100 through the general network connection 1171. It will be appreciated that the network connections shown are exemplary and other means of establishing a communications link between computing devices may be used.

As can be seen from the above descriptions, mechanisms for sharing content among a defined set of entities in an efficient manner have been disclosed. In view of the many possible variations of the subject matter described herein, we claim as our invention all such embodiments as may come within the scope of the following claims and equivalents thereto.

We claim:

1. One or more computer-readable storage media comprising computer-executable instructions for sharing content, the computer-executable instructions directed to steps comprising:

receiving manifests from multiple computing devices, each of the received manifests comprising an indication of segments of the shared content that are available from a computing device associated with the manifest and further comprising an indication, for each of the segments, of encodings of that segment that are available from the computing device associated with the manifest; and generating an aggregated manifest comprising, for each computing device associated with each received manifest, the indication of the segments of the shared content that are available from that computing device and the indication, for each of the segments, of the encodings of that segment that are available from that computing device;

utilizing the generated aggregated manifest to request the shared content from multiple computing devices identified in the aggregated manifest as comprising segments encoded in a requested encoding such that individual segments are interleaved from the multiple computing devices; and requesting segments, comprising equivalent portions of the shared content to segments that have already been received, which have been encoded in a lower resolution encoding than the segments that have already been received;

wherein each encoding of a segment is independent of, and was generated independently of, any different encoding of the segment.

2. The computer-readable storage media of claim 1, wherein the computer-executable instructions for receiving manifests from the at least one computing device comprise computer-executable instructions for receiving manifests from each computing device, from among the defined set of computing devices, that can be communicated with and that comprises at least a portion of the shared content.

3. The computer-readable storage media of claim 1, wherein the computer-executable instructions for receiving manifests from the at least one computing device comprise computer-executable instructions for receiving manifests from a server computing device comprising a channel definition, the channel definition comprising an indication of the shared content, an identification of each computing device in the defined set of computing devices and manifests received from the at least one computing device.

4. The computer-readable storage media of claim 1, comprising further computer-executable instructions for changing the requested encoding in accordance with how quickly the shared content is received from the multiple computing devices.

5. The computer-readable storage media of claim 1, wherein the requested encoding is selected commensurate with computational and presentation capabilities of a computing device executing the computer-executable instructions.

6. The computer-readable storage media of claim 1, comprising further computer-executable instructions for generating a manifest comprising an indication of segments received from the multiple computing devices and of received encodings of the received segments.

7. The computer-readable storage media of claim 6, comprising further computer-executable instructions for uploading the generated manifest to a server computing device for inclusion in a channel definition, the channel definition comprising an indication of the shared content, an identification of each computing device in the defined set of computing devices and manifests received from the at least one computing device.

8. A method for sharing content, the method comprising the steps of:
receiving manifests from multiple computing devices, each of the received manifests comprising an indication of segments of the shared content that are available from a computing device associated with the manifest and further comprising an indication, for each of the segments, of encodings of that segment that are available from the computing device associated with the manifest; and
generating an aggregated manifest comprising, for each computing device associated with each received manifest, the indication of the segments of the shared content that are available from that computing device and the indication, for each of the segments, of the encodings of that segment that are available from that computing device;
utilizing the generated aggregated manifest to request the shared content from multiple computing devices identified in the aggregated manifest as comprising segments encoded in a requested encoding such that individual segments are interleaved from the multiple computing devices; and
requesting segments, comprising equivalent portions of the shared content to segments the have already been received, which hive been encoded in lower resolution encoding than the segments that have already been received;
wherein each encoding of a segment is independent of, and was generated independently of, any different encoding of the segment.

9. The method of claim 8, wherein the step of receiving manifests from the at least one computing device comprises the step of receiving manifests from each computing device, from among the defined set of computing devices, that can be communicated with and that comprises at least a portion of the shared content.

10. The method of claim 8, wherein the step of receiving manifests from the at least one computing device comprises the step of receiving manifests from a server computing device comprising a channel definition, the channel definition comprising an indication of the shared content, an identification of each computing device in the defined set of computing devices and manifests received from the at least one computing device.

11. The method of claim 8, further comprising the steps of changing the requested encoding in accordance with how quickly the shared content is received from the multiple computing devices.

12. The method of claim 8, wherein the requested encoding is selected commensurate with computational and presentation capabilities of a receiving computing device.

13. The method of claim 8, further comprising the steps of generating a manifest comprising an indication of segments received from the multiple computing devices and of received encodings of the received segments.

14. The computer-readable media of claim 1, comprising further computer-executable instructions for presenting the shared content, received from the multiple computing devices, to a user; wherein the computer-executable instructions for requesting the segments comprising equivalent portions of the shared content to segments that have already been received are executed after the computer-executable instructions for presenting the shared content to the user.

15. The method of claim 8, further comprising the steps of presenting the shared content, received from the multiple computing devices, to a user; wherein the requesting the segments comprising equivalent portions of the shared content to segments that have already been received are performed after the presenting the shared content to the user.

16. One or more computer-readable storage media comprising computer-executable instructions for sharing content, the computer-executable instructions directed to steps comprising:
encoding the content, utilizing a first quality encoding, to generate a first set of segments;
independently encoding the content, utilizing a second quality encoding, having a lower resolution than the first quality encoding, to generate a second set of segments, wherein each segment in the second set of segments comprises an equivalent portion of the content to a corresponding segment in the first set of segments;
generating a manifest comprising an indication of the first and second sets of segments that are available and further comprising an indication of encodings for each of the available segments;
providing the generated manifest to a first computing device independent of a computing device executing the computer-executable instructions, wherein the first computing device generates an aggregated manifest from the generated manifest and from another manifest received from another computing device that comprises at least some of the first set of segments or at least some of the second set of segments, wherein the aggregated manifest comprises, for each computing device associated with each received manifest, an indication of segments of the content that are available from the associated computing device and an indication of the encodings for each of the available segments from the associated computing device;
copying, to the first computing device, only some of the first set of segments identified in the aggregated manifest; and subsequently copying, to the first computing device, at least some of the second set of segments identified in the aggregated manifest, the copied at least some of the second set of segments being of equivalent portions of the content to the copied some of the first set of segments.

17. The computer-readable storage media of claim 16, wherein the copying and the subsequent copying occur only in response to explicit requests, from the first computing device, for the some of the first set of segments and then subsequently for the least some of the second set of segments.

* * * * *